(12) United States Patent
Flagg

(10) Patent No.: X6265
(45) Date of Patent: Nov. 29, 1830

(54) THRASHING RICE, ROTARY

(76) Inventor: David Jr. Flagg

United States of America
Department of State

To all to whom these Presents shall come, Greeting

I certify that the annexed is a true copy of the Specification upon which
Letters Patent were granted on the 24th day of November 1830 to David
Flagg Junr for his improvement in machinery for threshing small grain
called Flagg's Rotary Rice Thresher

L.S.

In testimony whereof I Asbury Dickins
acting Secretary of State of the United States have hereunto
subscribed my name and caused the Seal of the Department of
State to be affixed. Done at the City of Washington this
thirteenth day of June AD 1835. and of the independence
of the United States of America the Fifty ninth
Asbury Dickins —

---

The Schedule referred to in these Letters Patent and making part of the
same containing a description in the words of the said David Flagg Junr
himself of his improvement in machinery for threshing small grain called
"Flaggs Rotary Rice Thresher"

To all persons to whom these Presents shall come. Be it Known that
I David Flagg Jr of the City County and State of New York have invented
made constructed and applied to use a new and useful improvement in a ma-
chine for threshing small grains of every description called "Flagg's Rotary
Rice thresher" for threshing Rice Wheat and other small grain from off the
Straw which machine and its manner of use is as follows. to wit, the machine
is constructed by having a frame four feet long two wide more or less according to
the power intended to give it motion. if for one horse two by four feet is of suf-
ficient size. the frame may be made of joists or any other suitable material.

two girts or side pieces to form each side of the frame. these are framed into four posts, and four other
short girts are framed into the said posts that form the ends of the frame. the side girts must be placed
at a suitable distance from each other so as to make the bearings for the journals of the Cylinder
shafts. and to bring them at their given distance from each other which depends wholly on
the diameter of the cylinders. Within this frame are placed two. three or more cylinders which
are made and constructed as . . . follows. take a log of wood of suitable size to give the dimen-
sions required when turned. which can only be ascertained by the size of the wheel and pinion
which connects two of the cylinders together. through the centre of these cylinders are wrought
iron shafts which extend through each end so as to form the journals. The Cylinder which
is called the feed cylinder and on whose shaft the driving wheel and pulley is placed. is
filled with rows of teeth and running directly around the cylinder and may be placed one
inch apart more or less according to the size of the teeth which may be varied in size as may
be thought fit. they may be placed very near together. and perfect one and half inch more
or less; these teeth may be made of wrought or cast iron and varied in form. and may be
set in straight or spiral rows. or in any other form or shape that may suit the builder
The top cylinder which is called the beater which operates upon the grain and threshes the
same. On this cylinder shaft is a pinion which gears with the main wheel on the feed cylinder.
in this cylinder are placed rows of teeth and are so arranged as to pass directly through the spaces
between the rows of teeth in the feed cylinder. these teeth must nearly fill the spaces. there must
be from six to eight teeth to form a row round the cylinder. and may be varied in form as
those of the feed cylinder. Directly under the beater is placed a cylinder which is called the
relief bed. this cylinder may vary in size from 5 to 6 in (more or less) in this are placed
rows of teeth corresponding with those of the feed cylinder. this may or may not be connected
with any other cylinder. This last named cylinder may be dispensed with and a permanent
concave bed with teeth put in its place which would answer the same purpose for many sorts
of grain. The feed table on which the grain is placed before threshed, is an inclined plane sim-
ilar to other machines. There is a bar placed across the machine and nearly over the feed cylin-
der. in this bar are placed rods or springs which pass down between the rows of teeth in the
feed cylinder to prevent the grain from passing any faster than required for threshing.
What I claim as my invention and improvement is the manner and form in which the cylinders
operate together as above described for the aforesaid purposes. New York November 19th 1830

Exd. Witnesses David Flagg Junr.
W.L. Flagler
[illegible] H Goldsmith (Patented 29 Novr 1830) $26 [illegible]